US012652161B2

(12) United States Patent
    Vigna

(10) Patent No.: US 12,652,161 B2
(45) Date of Patent: \*Jun. 9, 2026

(54) DATA CLASSIFICATION MODEL WITH KEY STORE FOR IMPORT, STORAGE, EXPORT AND SECURITY COMPLIANCE END POINTS CHECKS

(71) Applicant: David Michael Vigna, Sterling, VA (US)

(72) Inventor: David Michael Vigna, Sterling, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/807,981

(22) Filed: Jun. 21, 2022

(65) Prior Publication Data

US 2022/0337404 A1    Oct. 20, 2022

Related U.S. Application Data

(63) Continuation-in-part of application No. 16/946,460, filed on Jun. 23, 2020, now Pat. No. 11,368,466.

(60) Provisional application No. 62/902,001, filed on Sep. 18, 2019.

(51) Int. Cl.
    *H04L 9/08*        (2006.01)

(52) U.S. Cl.
    CPC ............ *H04L 9/0825* (2013.01); *H04L 9/083* (2013.01); *H04L 9/0894* (2013.01)

(58) Field of Classification Search
    CPC ................................................. G06F 16/1774
    USPC ......................................................... 707/706
    See application file for complete search history.

(56) References Cited

U.S. PATENT DOCUMENTS

| | | | |
|---|---|---|---|
| 10,956,477 B1 * | 3/2021 | Fang ....................... | G06F 16/35 |
| 2019/0169876 A1 * | 6/2019 | Hennessy ............... | G06F 21/34 |

\* cited by examiner

*Primary Examiner* — Baoquoc N To
(74) *Attorney, Agent, or Firm* — Dunlap Bennett & Ludwig PLLC

(57)            ABSTRACT

A method of applying a corporate secure compliance endpoint check matched to a user authentication with an Encryption Key Store for each data source application data feed used within a web application, including applying data classification levels and masking of sensitive data, thereby allowing for multiple export keys to multiple third-party applications.

2 Claims, 8 Drawing Sheets

Data Sources Feed of Different Apps with Different Encryption Keys

Data Sources Feed of Different Apps with Different Encryption Keys

Encryption Key Store Forms

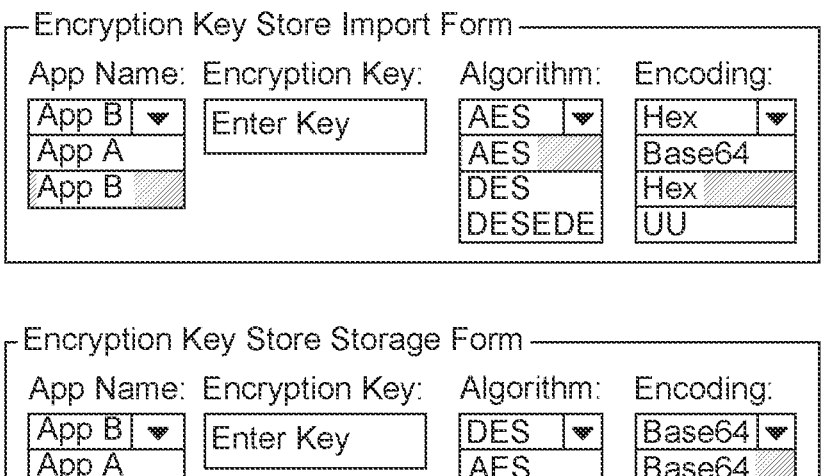

┌─ Encryption Key Store Import Form ──────────────────────────┐
│                                                              │
│  App Name:  Encryption Key:   Algorithm:      Encoding:      │
│  ┌────────┐ ┌──────────────┐  ┌─────────┐    ┌──────────┐   │
│  │App B ▼ │ │Enter Key     │  │AES    ▼ │    │Hex     ▼ │   │
│  ├────────┤ └──────────────┘  ├─────────┤    ├──────────┤   │
│  │App A   │                   │AES      │    │Base64    │   │
│  ├────────┤                   ├─────────┤    ├──────────┤   │
│  │App B   │                   │DES      │    │Hex       │   │
│  └────────┘                   ├─────────┤    ├──────────┤   │
│                               │DESEDE   │    │UU        │   │
│                               └─────────┘    └──────────┘   │
└──────────────────────────────────────────────────────────────┘

┌─ Encryption Key Store Storage Form ─────────────────────────┐
│                                                              │
│  App Name:  Encryption Key:   Algorithm:      Encoding:      │
│  ┌────────┐ ┌──────────────┐  ┌─────────┐    ┌──────────┐   │
│  │App B ▼ │ │Enter Key     │  │DES    ▼ │    │Base64  ▼ │   │
│  ├────────┤ └──────────────┘  ├─────────┤    ├──────────┤   │
│  │App A   │                   │AES      │    │Base64    │   │
│  ├────────┤                   ├─────────┤    ├──────────┤   │
│  │App B   │                   │DES      │    │Hex       │   │
│  └────────┘                   ├─────────┤    ├──────────┤   │
│                               │DESEDE   │    │UU        │   │
│                               └─────────┘    └──────────┘   │
└──────────────────────────────────────────────────────────────┘

┌─ Encryption Key Store Import Form ──────────────────────────────────────────┐
│                                                                              │
│  App Name:  Export To App:   Encryption Key:  Algorithm:     Encoding:       │
│  ┌────────┐ ┌─────────────┐  ┌─────────────┐  ┌──────────┐  ┌──────────┐    │
│  │App B ▼ │ │App C      ▼ │  │Enter Key    │  │DESEDE ▼  │  │UU      ▼ │    │
│  ├────────┤ ├─────────────┤  └─────────────┘  ├──────────┤  ├──────────┤    │
│  │App A   │ │App A        │                   │AES       │  │Base64    │    │
│  ├────────┤ ├─────────────┤                   ├──────────┤  ├──────────┤    │
│  │App B   │ │App B        │                   │DES       │  │Hex       │    │
│  └────────┘ ├─────────────┤                   ├──────────┤  ├──────────┤    │
│             │App C        │                   │DESEDE    │  │UU        │    │
│             ├─────────────┤                   └──────────┘  └──────────┘    │
│             │App D        │                                                 │
│             └─────────────┘                                                 │
│                                                                              │
│  ┌────────┐ ┌─────────────┐  ┌─────────────┐  ┌──────────┐  ┌──────────┐    │
│  │App B ▼ │ │App D      ▼ │  │Enter Key    │  │AES     ▼ │  │Base64  ▼ │    │
│  ├────────┤ ├─────────────┤  └─────────────┘  ├──────────┤  ├──────────┤    │
│  │App A   │ │App A        │                   │AES       │  │Base64    │    │
│  ├────────┤ ├─────────────┤                   ├──────────┤  ├──────────┤    │
│  │App B   │ │App B        │                   │DES       │  │Hex       │    │
│  └────────┘ ├─────────────┤                   ├──────────┤  ├──────────┤    │
│             │App C        │                   │DESEDE    │  │UU        │    │
│             ├─────────────┤                   └──────────┘  └──────────┘    │
│             │App D        │                                                 │
│             └─────────────┘                                                 │
└──────────────────────────────────────────────────────────────────────────────┘

FIG. 2

Data Classification with Encryption Key Store

Different User Levels — Power User — Managers — Employees — Developer — Authenticated Web Server — Data Connections — Custom Tables — Sales App — Commission App — PayRoll App

Application Role

| ROLE_ID | APP_NAME | APP_Role | Data Level ID |
|---|---|---|---|
| 1 | Sales App | Developer | 2 Prod, 4 Dev Test |
| 2 | Sales App | Sales PowerUser | 4 - Sensitive |
| 3 | Sales App | Sales - Manager | 3 - Confidential |
| 4 | Sales App | Sales - Employee | 4 - Proprietary |
| 5 | Commission App | Commission App Developer | 2 Prod, 4 Dev Test |
| 6 | Commission App | Commission PowerUser | 4 - Sensitive |
| 7 | Commission App | Commission - HR | 3 - Confidential |
| 8 | Commission App | Commission - Employee | 3 - Confidential |
| 9 | PayRoll App | Developer | 2 Prod, 4 Dev Test |
| 10 | PayRoll App | PayRoll PowerUser | 4 - Sensitive |
| 11 | PayRoll App | PayRoll - HR | 3 - Confidential |
| 12 | PayRoll App | PayRoll - Employee | 3 - Confidential |

Data Level For Classification

| DL_ID | Data Level Title |
|---|---|
| 4 | Sensitive |
| 3 | Confidential |
| 2 | Proprietary |
| 1 | Public |

Encrypt Key Store

| KeyID | App | Action |
|---|---|---|
| 1 | SAP Sales | Import |
| 2 | SAP Sales | Load |
| 3 | SAP Sales | Export To Other App(s) |
| 4 | Oracle HR | Import |
| 5 | Oracle HR | Load |
| 6 | Oracle HR | Export To Other App(s) |

FIG. 3A

Example of Masked Encryption Column

Data Warehouse Table and Column Classification with Encryption Key and Data Masked

| TAB_COL_ID | Data Source Name | Table Name | Column Name | Data Level ID | Load | Export |
|---|---|---|---|---|---|---|
| 1 | SAP Sales | Sales | Customer Name | 3 - Confidential | | |
| 2 | SAP Sales | Sales | Credit Card (Encrypt) | 4 - Sensitive | 2 | 3.X |
| 3 | SAP Sales | Sales | Credit Card (Mask & Encrypt) | 4 - Sensitive | 2 | 3.X |
| 3 | MS SQL DW | DW Sales | Sales Order | 3 - Confidential | | |
| 4 | MS SQL DW | DW Sales | Commission | 3 - Confidential | | |
| 5 | Oracle HR | PayRoll | SSN (Encrypt) | 4 - Sensitive | 5 | 6.X |
| 6 | Oracle HR | PayRoll | SSN (Mask & Encrypt) | 4 - Sensitive | 5 | 6.X |
| 7 | Oracle HR | PayRoll | Employee Name | 2 - Proprietary | | |

FIG. 3B

Old Method of Coding Data Role Checks, Decrypt and Masking Columns

App Groups
A & B

Power User

Managers

Employees

Developers

Authenticated

Web Server

Data
Connections

Database

| Old Method<br>Code Each Query on the Page to Pull the Correct<br>Column Data Per the User Role |
|---|
| Get Data Query Sales Code Example |
| <Check Compliance of WorkStation><br>Select<br>Sales ID,<br>Sales Date,<br><Check User Role = Confidential><br>          Client Company (Confidential),<br><Check User Role = Proprietary><br>          Product (Proprietary),<br>Product Code,<br>QTY,<br>Unit Price,<br>Total Sale,<br><Check User Role = Sensitive><br>          *<Decrypt the Masked Column>*<br>          Credit Card (Masked) - Sensitive<br>From Sales Table |
| Code Each Page To Decrypt the Columns User the<br>Different Application Keys |

Developers Had to Code
Different Applications With
Different Keys

FIG. 4
(PRIOR ART)

New Method with Workstation Compliance & User Check, App
Decrypt and Export using Multiple Keys

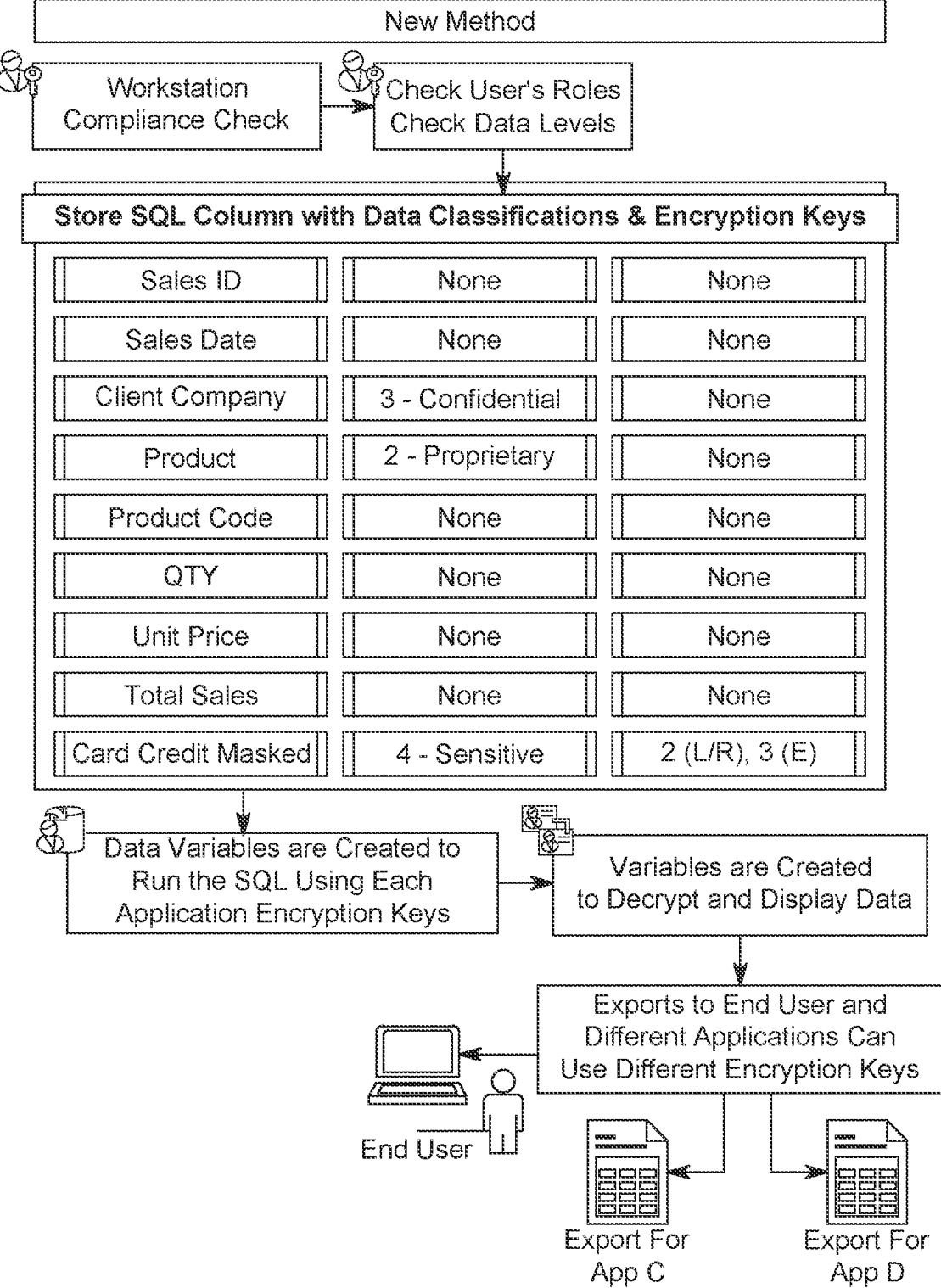

| New Method | | |
|---|---|---|

| Workstation Compliance Check | Check User's Roles Check Data Levels | |
|---|---|---|

Store SQL Column with Data Classifications & Encryption Keys

| Sales ID | None | None |
|---|---|---|
| Sales Date | None | None |
| Client Company | 3 - Confidential | None |
| Product | 2 - Proprietary | None |
| Product Code | None | None |
| QTY | None | None |
| Unit Price | None | None |
| Total Sales | None | None |
| Card Credit Masked | 4 - Sensitive | 2 (L/R), 3 (E) |

Data Variables are Created to Run the SQL Using Each Application Encryption Keys Variables are Created to Decrypt and Display Data Exports to End User and Different Applications Can Use Different Encryption Keys End User Export For App C Export For App D

FIG. 5

Employee Monthly Sales for Employee with Sample Masked Decrypted Data

A Web Page

← → ⟳   🔍 http://

⊠ ≡

Employee Monthly Sales For John Doe

—Sales—

| ID ▲ | DATE ▲ | Client (Confidential) ▲ | Product ▲ | Product Code (Proprietary) | Unit Cost (Sensitive) |
|---|---|---|---|---|---|
| S1001 | 2017-12-16 | ACME | Widgets | W1A | $50 |
| S1001 | 2017-12-16 | ACME | Widgets | W1B | $25 |
| S1002 | 2017-12-16 | ABC Products | Widgets | W1A | $50 |
| | | | | | |

—Commission—

| ID ▲ | DATE ▲ | Client Company (Confidential) ▲ | Product (Proprietary) ▲ | Product Code | Sales |
|---|---|---|---|---|---|
| S1001 | 2017-12-16 | ACME | Widgets | W1A | $1500 |
| S1001 | 2017-12-16 | ACME | Widgets | W1B | $500 |
| S1002 | 2017-12-16 | ABC Products | Widgets | W1A | $1000 |
| | | | | | |

—PayRoll—

| PAYID ▲ | DATE | EMPLID ▲ | FULL NAME ▲ | SSN (Sensitive & Masked) | Base Salary (Confidential) |
|---|---|---|---|---|---|
| P1001 | 2017-12-31 | 101 | John Doe | *--1234 | $500 |
| | | | | | |
| | | | | | |

FIG. 6A

Employee Monthly Sales for Employee with Sample Masked Decrypted Data

| QTY | Unit Price | Total Cost (Sensitive) | Total Sales |
|---|---|---|---|
| 15 | $100 | $750 | $1500 |
| 10 | $50 | $250 | $500 |
| 10 | $100 | $500 | $1000 |
| | | Sum Cost $1500 | Sales total $3000 |

| Commission Rate (Sensitive) | Commission |
|---|---|
| 20% | $300 |
| 10% | $50 |
| 20% | $200 |
| | Commission Total $550 |

| Commission (Confidential) | Total Pay | Taxes | Net Pay |
|---|---|---|---|
| $500 | $1050 | -$300 | -$750 |

FIG. 6B

DATA CLASSIFICATION MODEL WITH KEY STORE FOR IMPORT, STORAGE, EXPORT AND SECURITY COMPLIANCE END POINTS CHECKS

CROSS-REFERENCE TO RELATED APPLICATION

This application claims the benefit of priority of U.S. provisional application No. 62/902,001, filed 18 Sep. 2019, and non-provisional application Ser. No. 16/946,460, filed 23 Jun. 2020, as a continuation in part application thereof, the contents of both are herein incorporated by reference.

BACKGROUND OF THE INVENTION

This expands the Data Classification of Columns for Web Reports and Widget patent application Ser. No. 16/946,460, which applies a data classification to each data column of the data source, allowing for the mapping of role levels to a data source and data column. That model is used to check a data classification level associated with the data classification and a user's role access level prior to setting variables to create a query and rendering a report for said user.

Defining the data sensitivity level of the data and user access level is not enough to protect the data within the system. The present invention addresses the protection of the data from Import, Storage and Export to multiple third-party applications and adds decryption and encryption keys along with a workstation compliance lookup. During import of a data feed there may be a need for decryption before loading into a data warehouse. Stored data may need to be encrypted and data masking and formatting of the stored data may be needed to protect the sensitive data at rest.

An example could be an Employee's Social Security Number that is contained in the data feed, but the organization's reporting logic is only to display the last 4 characters on general or payroll reports and only the whole number on detailed reports to the HR team.

Most reporting tools provide a masking function within the report designer that allows the developer to pick the masking rule for the display on the reports. This method does not protect the data stored within the reporting database since the data is stored RAW within the data warehouse not encrypted. The data source feed with sensitive data may be unprotected, not encrypted, or masked and a data breach can cause damage to everyone involved.

There is also the other issue of exporting an application's data to a third party that can create risk for the data to be compromised. Not only is there a check for the encrypt keys but there are source and target systems checks for compliance with a valid security review and expiration date. Most systems check a user's roles for access, the subject disclosure also adds checks to the workstation or server before exporting data or extracting to another system. The compliance check can be helpdesk staff manually adding expiration dates for workstations or as complex as the tables being updated using secure scanning tools of linking to a third-party compliance checking application.

SUMMARY OF THE INVENTION

After adding a data level to each column to protect the sensitive data, the present invention adds secondary selection menus when defining the Data Column Sensitivity Levels in the Data Classification Model. The process initially creates an Import Export Key Store and Data Formatting Model. The diagrams will just display the encryption and workflow in the simplest examples. A form is used for each application's Encryption Key, allowing for multiple keys to be stored for the Import, Storage and Export of each application and a formatting mask applied before encryption. Multiple export keys can be defined for Export to another applications. This way the other application team only knows the key needed to decrypt the data provided to them.

This Key Store defines the Decryption and Encryption keys for multiple applications and server and developers can login and use the form to update their application keys. The storage keys may need to be changed from time to time and there is a function that enables re-encryption using an updated keys form, allowing for key recreation and encryption of the sensitive data by a lead developer or server admin assigned to each application and development team.

A Secure End Point model is used to match the end user's workstation or server and to validate the last compliance audit date or compliance expiration date. There is no point in exporting data or archiving reports to servers or workstations that are not in compliance with the organization's security standard.

In one aspect of the present invention, a method of protecting data of a plurality of applications through a data source connection with a web application, the method including modeling to one or more intermediate tables to be used in the web application, wherein each intermediate table comprises each data classification of each of the plurality of applications and an associated data classification level for each data classification, wherein the associated data classification levels are defined by a data modeler; storing an import key, a storage key, and multiple export keys of each application defined for exporting data to end users or different third-party applications; and formatting a mask applied before encryption of each of the multiple export keys.

In another aspect of the present invention, the above method further includes applying a data classification level to each data classification comprising the encryption key and a masking can be defined for each data table and column in the data model for each application; and checking a data classification level associated with the data classification and a user's data access level prior to setting variables to create a query that decrypts sensitive data and renders output for said user.

In yet another aspect of the present invention, an end-point security compliance check system for a terminal is run checking an approved list for corporate compliance logic before querying to an end-user or export to a third-party corporate application.

These and other features, aspects and advantages of the present invention will become better understood with reference to the following drawings, description, and claims.

BRIEF DESCRIPTION OF THE DRAWINGS

FIG. 2 is a diagram illustrating the Encryption Key Store Forms.

FIG. 3A is an exemplary data classification table with Encryption applied to the Sensitive Data Level columns.

FIG. 3B is an exemplary of a Masked Encryption Column in the data model with Load and Export keys.

FIG. 4 is the prior art of Coding Data Role Checks, Decrypt and Masking Columns.

FIG. 5 is the new method of compliance checks of the workstation and user roles check before data queries and decryption and the export function.

FIGS. 6A and 6B is an exemplary employee monthly sales report with the masking of the Sensitive Social Security Number of the employee.

DETAILED DESCRIPTION OF THE INVENTION

Figure 1:
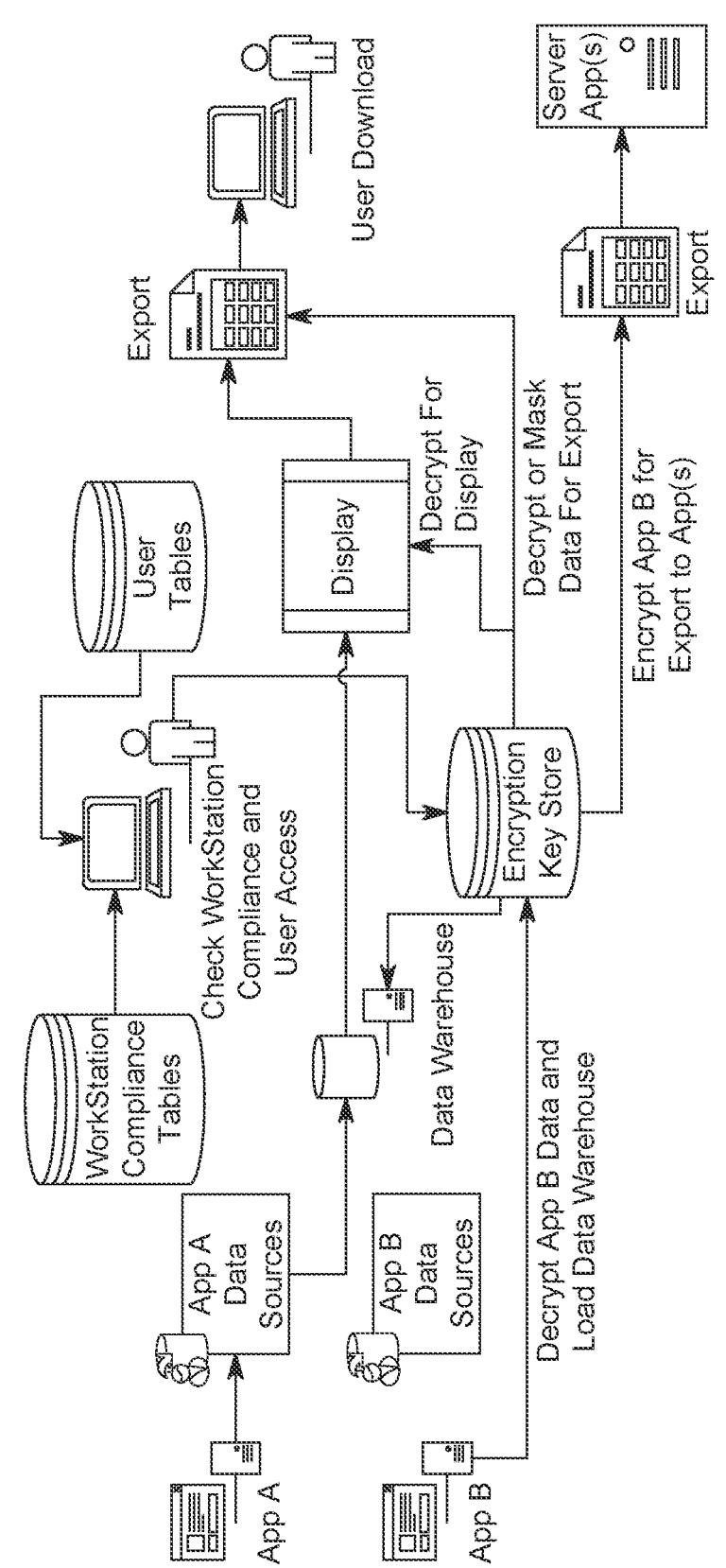
FIG. 1 is a diagram illustrating the Data Sources Feed of Different Apps with Different Encryption Keys.

The following detailed description is of the best currently contemplated modes of carrying out exemplary embodiments of the invention. The description is not to be taken in a limiting sense but is made merely for the purpose of illustrating the general principles of the invention, since the scope of the invention is best defined by the appended claims.

Referring to FIGS. 1 through 6B, the present invention may include a method applying decryption and encryption keys to the application data which are used during Import, Storage and Export to users or multiple third-party applications with masking of data columns to protect sensitive data columns.

FIG. 1 illustrates the secure end point check to an assigned workstation or an employee corporate laptop. There can be a simple form that the helpdesk uses to load the compliance table and match the terminal (e.g., workstation or laptop) to a user. The diagram workflow for App A is not using the encryption model where App B uses the model during Import, Storage and Export to an end user or third-party applications.

FIG. 2 illustrates the Encryption Key Store Forms used to the load the data and App B is used since App B exports to App C and App D using different Encryption Keys, and different algorithm and encoding.

FIG. 3A illustrates data classification tables in parent application Ser. No. 16/946,460. This figure illustrates the Encryption Key Store and lists Data Level and Application Role tables with sample data for the Employee Dashboard that includes the Summaries Reports from the Sales Application, Commission Application, and the PayRoll Applications.

FIG. 3B explains for this patent the extended the data model from just the simple data level modeling but includes the additional encrypted column and masked columns within the modified data model. The SAP Sales application and sales table encrypt and mask the Credit Card column. The Oracle HR application Payroll table encrypt and mask the SSN column. Each application may use encryption and masking rules based on Application Encryption Key Store and Masking rules. The additional columns can be masked or encrypted or both masked and encrypted based on how you define the rules within the data model.

FIG. 4 illustrates data queries rendering data and the export function. This figure displays a sample of the old method of coding checks on each query.

FIG. 5 illustrates data queries using the data model to restrict columns by roles with the additional (L)oad, (R)ender and (E)xport and Encryption Key IDs matched to the sensitive data. The new method confirms the workstation compliance is valid, checks the user's data access level before setting variables to create the query that checks column data classification, and decrypts the sensitive data and renders or exports. This method allows for the encryption keys to be added to the query without the need to hardcode each key need per report query and allows for key updates without a need to change any hardcoded values in the SQL FIGS. 6A and 6B illustrates an employee Dashboard. Each section of the page is a report from different applications. The Dashboard displays summaries of Sales Data, Commissions and the Payroll summary. When defining the Data Levels of a column a secondary Masking and Encryption rule can be defined this example displays the Masking of the SSN column for John Doe which was masked, encrypted and stored in the Data Warehouse. The model decrypts the masked data and displays this within the report. The front end looks the same as other reporting tools but uses the Key Store to Encrypt and Decrypt the data for display or export.

Table Columns are mapped to a Data Classification Level, allowing for encryption key mapping and a validation data type masking, which in turn enables each developer team to define the encryption key and masking format within their assigned application. As those columns are reused with report widgets the default actions can be customized by selecting the encrypted data columns and applying a custom masking rule. In one embodiment, one encrypted column and one masked data column are displayed. If a client needs for the masked data to be encrypted that is also possible but this embodiment is just displaying the masked data for display within the sample tables for the sensitive Credit Card and SSN.

This methodology of encryption defined at the data classification level includes secure end point checks at the phases of Storage and Export, providing more security for the data within our web application.

The web application, or webapp, of the present invention is an application that is accessed via a web browser over a network (e.g., Internet, mobile phone network, etc.). The web application can also be a computer software application that is coded in a browser-supported language (such as HTML, CSS, JavaScript, Java, PHP, etc.) and reliant on a common web browser to render the application executable. Web application code is typically stored on servers. At launch, the browser uses a web address such as a Uniform Resource Locator (URL) to fetch the web application code. The code is then downloaded to the computing system and the application is executed, either inside the browser or using the browser functionality. Over the course of execution, additional code can be downloaded and executed. The computing system may also store the web application code locally, in which case the web application URL points to a local file. The web application may also be preloaded on the computing system prior to delivery. This is common with, for example, preloaded applications on cell phones or laptop computers. The present invention may utilize any appropriate web application, including future web applications.

It should be understood, of course, that the foregoing relates to exemplary embodiments of the invention and that modifications may be made without departing from the spirit and scope of the invention as set forth in the following claims.

What is claimed is:

1. A method of protecting data of a plurality of computer applications through a data source connection with a web application, the method comprising:

modeling to one or more intermediate tables to be used in the web application, wherein each intermediate table comprises each data classification of each of the plurality of applications and an associated data classification level for each data classification, wherein the associated data classification levels are defined by a data model configured to modify the data structures within the one or more intermediate tables to add an encryption column and a masked column for each application of the plurality of the application;

storing an import key, a storage key, and multiple export keys of each application defined for exporting data to end users or different third-party applications; and applying a formatting mask before encryption using each of the multiple export keys for exporting to the end users, different corporate applications, third-party applications or preloaded on devices.

2. The method of claim 1, further comprising checking a device compliance classification level associated with a requesting device or process and a data access level of the end user prior to setting variables to address different permission levels on different requesting devices to create a query that decrypts sensitive data and renders output for said user.

\* \* \* \* \*